United States Patent
Wu et al.

(10) Patent No.: US 12,079,582 B1
(45) Date of Patent: Sep. 3, 2024

(54) COLLEGE ADMISSIONS AND CAREER MENTORSHIP PLATFORM

(71) Applicant: Empowerly, Inc., Berkeley, CA (US)

(72) Inventors: Hanmei Wu, San Francisco, CA (US); Hanjoon Kim, San Bruno, CA (US); Changxiao Xie, San Antonio, TX (US)

(73) Assignee: EMPOWERLY, INC., Berkeley, CA (US)

( * ) Notice: Subject to any disclaimer, the term of this patent is extended or adjusted under 35 U.S.C. 154(b) by 0 days.

(21) Appl. No.: 18/333,117

(22) Filed: Jun. 12, 2023

Related U.S. Application Data

(63) Continuation of application No. 17/083,059, filed on Oct. 28, 2020, now Pat. No. 11,714,967.

(60) Provisional application No. 62/929,714, filed on Nov. 1, 2019.

(51) Int. Cl.
| | |
|---|---|
| *G06F 40/205* | (2020.01) |
| *G06F 40/30* | (2020.01) |
| *G06N 20/00* | (2019.01) |
| *G06Q 10/101* | (2023.01) |
| *G06Q 30/0282* | (2023.01) |
| *G06Q 50/20* | (2012.01) |
| *G06Q 20/12* | (2012.01) |

(52) U.S. Cl.
CPC ............ *G06F 40/30* (2020.01); *G06F 40/205* (2020.01); *G06N 20/00* (2019.01); *G06Q 10/101* (2013.01); *G06Q 30/0282* (2013.01); *G06Q 50/2053* (2013.01); *G06Q 20/127* (2013.01); *G06Q 50/2057* (2013.01)

(58) Field of Classification Search
CPC ........ G06F 40/30; G06F 40/205; G06F 40/56; G10L 15/063; G10L 15/01; G10L 2015/0638
See application file for complete search history.

(56) References Cited

U.S. PATENT DOCUMENTS

| | | | | |
|---|---|---|---|---|
| 8,721,339 | B2 * | 5/2014 | White | G09B 7/02 |
| | | | | 434/156 |
| 10,255,820 | B2 * | 4/2019 | Higgins | G09B 7/02 |
| 10,353,720 | B1 * | 7/2019 | Wich-Vila | G06F 3/04842 |
| 10,565,213 | B2 * | 2/2020 | Lau | G06F 16/24578 |
| 10,964,224 | B1 * | 3/2021 | Zhang | G09B 19/00 |
| 11,714,967 | B1 * | 8/2023 | Wu | G06Q 30/0282 |
| | | | | 704/9 |
| 2006/0172276 | A1 * | 8/2006 | Higgins | G09B 7/02 |
| | | | | 434/362 |
| 2006/0194183 | A1 * | 8/2006 | Attali | G09B 7/06 |
| | | | | 434/362 |
| 2007/0065797 | A1 * | 3/2007 | Elgart | G09B 7/04 |
| | | | | 434/322 |
| 2007/0141544 | A1 * | 6/2007 | Nakane | G06F 40/279 |
| | | | | 434/353 |

(Continued)

OTHER PUBLICATIONS

U.S. Appl. No. 17/083,059 Notice of Allowance dated Apr. 13, 2023.
U.S. Appl. No. 17/083,059 Office Action dated Sep. 16, 2022.

*Primary Examiner* — Vijay B Chawan
(74) *Attorney, Agent, or Firm* — WILSON SONSINI GOODRICH & ROSATI

(57) ABSTRACT

The present disclosure provides a college admissions platform. The college admissions platform can have an application portal, a research request marketplace, an essay editing marketplace, and an essay sorter.

20 Claims, 11 Drawing Sheets

(56) References Cited

U.S. PATENT DOCUMENTS

| | | | | |
|---|---|---|---|---|
| 2010/0223051 A1* | 9/2010 | Burstein | ............... | G06F 40/253 |
| | | | | 704/9 |
| 2011/0027769 A1* | 2/2011 | Andreyev | ................ | G09B 7/02 |
| | | | | 434/362 |
| 2015/0006423 A1* | 1/2015 | Ma | ......................... | G06Q 10/00 |
| | | | | 705/327 |
| 2015/0006424 A1* | 1/2015 | Ma | ..................... | G06Q 50/2053 |
| | | | | 705/327 |
| 2015/0050631 A1* | 2/2015 | Reynaldo | ................ | G09B 5/06 |
| | | | | 434/308 |
| 2015/0370769 A1* | 12/2015 | Pereira Filho | ........ | G06F 40/166 |
| | | | | 726/28 |
| 2016/0055145 A1* | 2/2016 | Chauhan | ............... | G06Q 10/10 |
| | | | | 704/9 |
| 2018/0137433 A1* | 5/2018 | Devarakonda | ......... | G06N 5/022 |
| 2018/0349336 A1* | 12/2018 | German | ................... | G09B 5/02 |
| 2019/0180641 A1* | 6/2019 | Donaldson | ............ | G09B 19/00 |
| 2019/0304320 A1* | 10/2019 | Apokatanidis | ........... | G09B 7/02 |
| 2019/0311641 A1* | 10/2019 | Plant | ...................... | G06N 3/042 |
| 2019/0377785 A1* | 12/2019 | N | ............................ | G06F 40/20 |
| 2020/0081964 A1* | 3/2020 | Maneriker | ............ | G06F 40/103 |
| 2020/0273364 A1* | 8/2020 | Donaldson | ............ | G06N 5/046 |

\* cited by examiner

FIG. 10

COLLEGE ADMISSIONS AND CAREER MENTORSHIP PLATFORM

CROSS-REFERENCE

This application is a continuation of Ser. No. 17/083,059, filed Oct. 28, 2020, which claims the benefit of Ser. No. 62/929,714, filed Nov. 1, 2019, which are incorporated herein by reference in their entirety and to which applications we claim priority under 35 USC § 120.

BACKGROUND

The college application process has grown increasingly complex as the number of schools to which students apply has increased. Different schools may have different application requirements, including institution-specific essay prompts that may appear to have little in common with other schools' essay prompts. College applicants may also have a variety of other demands on their time, making the drafting of multiple different essays difficult.

The increase in the number of applications to colleges and universities has increased the quality of applicant essay that is needed. While traditional editing may improve the quality of an application, it may be expensive and difficult to find a trusted editor. Additionally, high-quality and personalized resources and mentorship may be scarce. With an average 1-to-400 counselor-to-student ratio at high schools and universities, students may wait weeks to months to get the guidance they need for college and career success. Private counselors are available, but they are often extremely expensive at $400 per hour on average. And the advice given by school and private counselors may tend to be generic and not tailored to the specific needs of the student.

SUMMARY

The present disclosure provides a college admissions and career counseling platform. The college admissions and career counseling platform can have an application portal, a research request marketplace, an essay editing marketplace, an essay sorter, and a mentorship platform.

The application portal can enable an applicant to select one or more schools in which he is interested. In response, the application portal can display the required application materials for each school. The applicant can aggregate all of such materials on the application portal. The application portal can predict the applicant's likelihood of being accepted to a particular school by comparing his academic credentials and experiences to other applicants' academic credentials and experiences. The application portal can enable the applicant to apply to schools directly rather than through the schools' individual websites.

The application portal can save an applicant significant time in researching required application materials for each school by automatically importing such requirements to the application portal. The application portal can additionally save an applicant time in applying to schools by enabling the applicant to apply to all schools directly rather than from the schools' individual websites, which may be time-consuming.

The research request marketplace can allow an applicant to submit a question to a college admissions and career counseling platform, where a contractor can claim a question that is within the contractor's expertise. The contractor may then perform searches or use expert knowledge to generate an answer to the question and provide the answer to the applicant. The applicant may then rate the answer on its quality. The research request marketplace may reduce the amount of time a user expends in finding answers to difficult questions and may improve the quality of the answers to which the user has access.

The essay editing marketplace can enable an applicant to submit one or more documents to the college admissions and career counseling platform, where an editor can claim the document to edit it. The editor may then produce an edited document by editing and/or providing feedback on the document, which may include insertions, deletions, comments, and other feedback. The essay editing marketplace may then return the edited document to the applicant, who may then incorporate or reject the edits. The essay editing marketplace can provide a variety of advantages, including reducing applicant effort and stress expended in finding a qualified editor. The essay editing marketplace may also allow editors to offer their services at different rates, or for users to submit their desired cost for an editing session. This may create a marketplace that may increase the quality of edits and reduce the total cost paid for the edits.

The essay sorter can generate groups of similar essay prompts. The essay sorter can receive a plurality of essay prompts, e.g., by scraping schools' application websites. The essay sorter can process the essay prompts using a natural language processing (NLP) algorithm. The NLP algorithm can find features that are common to multiple essay prompts that would allow those essay prompts to be answered using the same or similar essays. The essay sorter can then display the groups to an applicant. The essay sorter can significantly reduce the time and effort that the applicant is required to spend in writing essays for many different schools.

The mentorship platform can enable a more experienced mentor (e.g., a professional counselor or an industry professional) to mentor and help a more inexperienced member (e.g., a student or early career professional). The mentorship platform can incorporate a variety of components, including smart notifications for the mentor and the member, automated messages, scheduling systems, resource databases, research teams, editing teams, and payment systems to improve the efficiency of the platform. Mentor selection can be based on a variety of inputs, including member data (e.g., the member's field of interest, the member's background), mentor data (e.g., the mentor's career), pricing data, availability, and the like. The mentor and member can schedule meetings and meet online using aspects of the platform. The mentorship platform may allow industry professionals, such as professional private counselors, Wall Street traders, engineers, startup founders, and others to be mentors. The features of the mentorship platform may allow all operational inefficiencies to be automated so that the mentors can spend all of their time mentoring without friction. Customers on the platform may enter their data get matched to their best fit counselor that can give them the best personalized advice and can schedule sessions and meet with the counselor over the platform.

In an aspect, the present disclosure provides a method comprising: (a) obtaining a plurality of essay prompts; (b) processing each essay prompt of the plurality of essay prompts using a natural language processing (NLP) algorithm to extract at least one feature from the each essay prompt; and (c) using the at least one feature from the each essay prompt, generating two or more subsets of the plurality of essay prompts, wherein an essay prompt in a subset satisfies a measure of similarity with respect to each other essay prompt in the subset such that a single essay can be responsive to each essay prompt in the subset.

In some embodiments, the method further comprises recommending a theme or topic for the single essay. In some embodiments, a quantity of the two or more subsets is minimized. In some embodiments the natural language processing algorithm is a machine learning algorithm. In some embodiments generating the two or more subsets of the plurality of essay prompts comprises processing the at least one feature from each essay prompt using a clustering algorithm.

Another aspect of the present disclosure provides a system comprising: one or more computer processors; and memory comprising machine-executable instructions that, upon execution by the one or more computer processors, implements an online editing marketplace, wherein the online editing marketplace is configured to: receive one or more documents from a user, the one or more documents comprising college application documents; associate the one or more documents with an editor in response to the editor claiming the one or more documents; receive edited versions of the one or more documents from the editor, which edited versions comprising one or more of deletions, additions, comments, and feedback; and display the edited versions of the one or more documents to the user.

In some embodiments, the editing marketplace is further configured to receive feedback on the editor from the user. In some embodiments edited versions of the one or more documents comprise emotional tone scores that indicate a likelihood that a reader of the one or more documents will experience one or more emotions.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 10 is an example detail view of a college.

DETAILED DESCRIPTION

Figure 1:
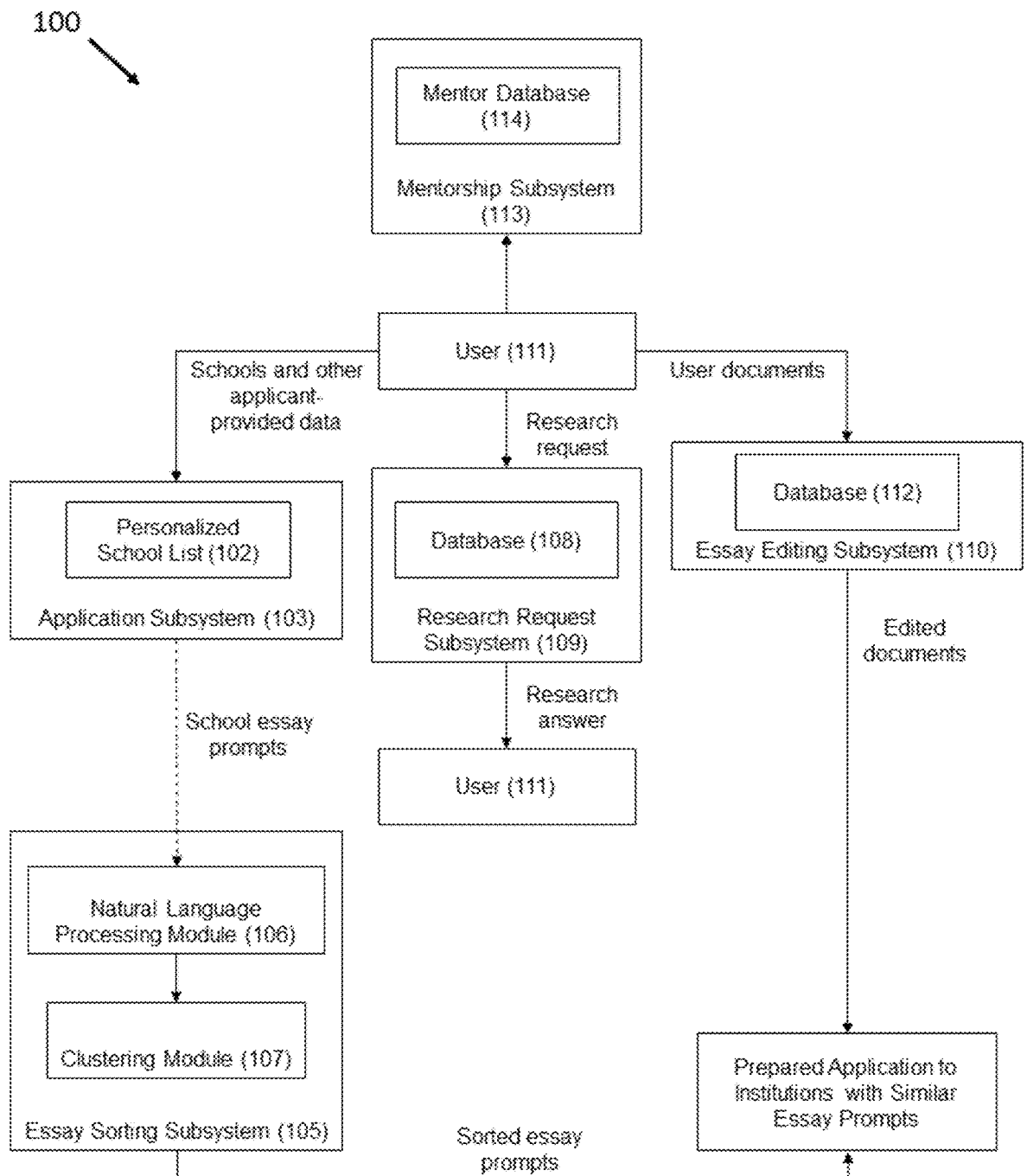
FIG. 1 schematically illustrates a college application and career mentorship platform.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides a college admissions platform. The college admissions platform can have an application portal, a research request marketplace, an essay editing marketplace, and an essay sorter. The application portal can automatically import required application materials from multiple schools and enable an applicant to aggregate those materials on the portal and apply directly to the schools. The research request marketplace can connect applicants to experts who can answer their college admissions questions. The applicants can rate the experts on the quality of their answers. The essay editing marketplace can enable an applicant to submit a document to the college admissions platform, where an editor can claim the document to edit it. The editor may then produce an edited document by editing and/or providing feedback on the document, which may include insertions, deletions, comments, and other feedback. The essay sorter can group a plurality of essay prompts by their similarity, such that a single essay may be responsive to essay prompts in a particular group.

Though described herein with respect to use in college applications, the methods and systems of the present disclosure may be used for a variety of different tasks. For instance, methods and systems of the present disclosure may be used to classify and/or edit financial aid applications, internship applications, job applications, award applications, resumes, curriculum vitae, or other applications that use written components. In another example, an early career professional can be mentored by a more senior person in the professional's field, the professional can utilize the essay editing marketplace to improve his resume, and the professional can request information from the research request marketplace on what the best companies for early career professionals are. The terms "document" and "essay" are interchangeable as used herein.

FIG. 1 schematically illustrates a college application platform 100. The college application platform 100 can be implemented on one or more appropriately-programmed computers in one or more locations. The application platform 100 can include an application subsystem 103, an essay sorting subsystem 105, a research request subsystem 109, an essay editing subsystem 110, and a mentorship subsystem 112. The various subsystems may be used in concert as shown in FIG. 1, individually, or in any combination. For example, a user 111 may utilize the essay sorting subsystem 105 and the essay editing subsystem 110 without using the research request subsystem 109 or the application subsystem 103. In another example, a user 111 may only use the essay editing subsystem 110. The dashed lines between application subsystem 103 and essay prompts 104 denotes that the essay prompts may come from the selected school list, but it is not necessary that the essay prompts do.

The application subsystem 103 may utilize user provided-information and preferences as at least a part of the information used to generate the personalized school list 102. The user-provided information and preferences may comprise grade point average (GPA), standardized test scores (e.g., Scholastic Aptitude Test (SAT) scores, American College Testing (ACT) scores, Advanced Placement (AP) scores, International Baccalaureate (IB) scores), extracurricular activities the user participates in (e.g., sports, music, leadership), information about the user's preferred type of college (e.g., rural, urban, large, private, in-state, out-of-state, etc.), a list of the user's preferred colleges, a list of back-up colleges, user preferences about prospective major, financial data, and the like. Additional information used to generate the personalized school list may comprise school data (e.g., acceptance rates, school type, school ranking, program ranking), school student demographic data, school faculty data, profiles of students who were accepted into a given school, and the like.

The application subsystem 103 may use a computer algorithm to generate the personalized school list 102. The algorithm may use a weighted combination of the user provided-information, user provided preferences, and additional information to generate the personalized school list. The subsystem 103 may use the user-provided information and preferences to directly form the list 102 (e.g., use the user provided list of colleges to form the list). The list 102 may be broken into one or more subsets. The subsets may comprise classifications of the schools into at least one category. The at least one category may be safety schools, target schools, reach schools, high reach schools, or any combination thereof. The list 102 may further comprise data related to applying to the schools on the list. The data may comprise application due dates, specific school application criteria, or other information about applying to a school among the plurality of schools on the list. The list may comprise a dynamic list (e.g., schools may be added or removed).

The application subsystem 103 may comprise all of the application materials which are required by a school of the plurality of schools (e.g., essays, recommendations, resume, awards, activities, GPA). The subsystem may retrieve the application materials from the websites of the schools (e.g., scrape the websites for data), from other application materials databases (e.g., retrieve from the common application), college admissions officers (e.g., interview), or any combination thereof. The application subsystem 103 may further comprise a portal for a user to keep track of all of the application materials. The application subsystem 103 may further comprise a portal for a user to submit at least part of the application materials without going to the school's submission portal. The portal may include an application programming interface (API) that communicates the school submission portals.

The research request subsystem 109 may accept a user-originated research request. The user originated research request may be a complex research question. For example, a user may ask "What kind of background does the University of Michigan Bachelor of Arts CS program look for?" In this example, the user may be unable to easily find the answer without expending substantial time or effort. The research request may be uploaded to a marketplace for research requests. The marketplace may comprise an online marketplace. The marketplace may be accessible by at least one research contractor. The research contractor may claim the research request on the marketplace. By claiming the research request, the research contractor may prevent other research contractors from claiming or answering the research request. The research contractor may then determine the answer to the research request. For example, for the previous question, "What kind of background does the University of Michigan Bachelor of Arts Computer Science (CS) program look for?" the contractor may approach a colleague at the University of Michigan CS department to determine the answer. The research contractor may also have personal knowledge of the answer and thus be able to determine the answer without outside help. The research contractor may provide the answer to the research request to the user by uploading the answer to the research request subsystem 109, or by sending it directly to the user. The user may rate the quality of the answer. The rating may be used to determine the efficacy of the research contractor, and the rating, or a derivative of the rating, may be displayed to other users.

The research request subsystem 109 may utilize machine learning natural language processing to automate certain research requests. For example, a user can ask a common question such as "What internship opportunities are there for a woman in STEM fields?" to the research request database, and the natural language processing algorithm can search a database of previous answers to find an answer with sufficient similarity. In this example, the research request database can then output the answer with sufficient similarity to the user. In an alternative example, the research request database can output the answer to a research contractor, who can edit the answer to the specifics of the user.

The research request subsystem 109 may comprise a database 108. The database may store information about a plurality of research contractors, such as contact information, financial information, user ratings of contractor answers, ratings of the contractor by other experts or contractors, previous contractor answers, or any combination thereof. The essay editing subsystem 110 may comprise a similar database 112 for a plurality of essay editors. The database 108 and the database 112 may be the same database.

The mentorship subsystem 113 may comprise a marketplace where a user 111 can connect with one or more mentors. The mentors may be professionals in a field of interest of the user, professional career counselors, professional college counselors, or the like. For example, an early career professor can connect with a tenured professor in the same field, and the tenured professor can help guide the early career professor through the first years of the job. The mentors may be able to interact with the user via an online portal, such as a video conference portal or a text chat. The mentorship subsystem may comprise a mentorship database 114. The mentorship database may comprise information about a plurality of possible mentors such as age, profession, educational background, experience mentoring, and the like. The user may be able to give a rating to a mentor.

Figure 2:
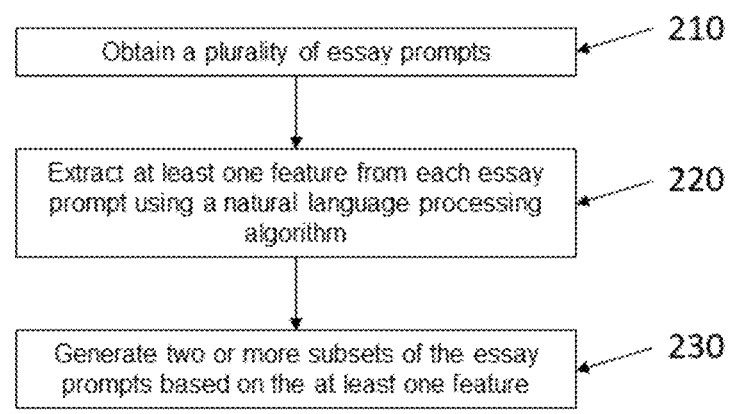
FIG. 2 is a flow chart of an example process for generating groups of similar essays.
Figure 3:
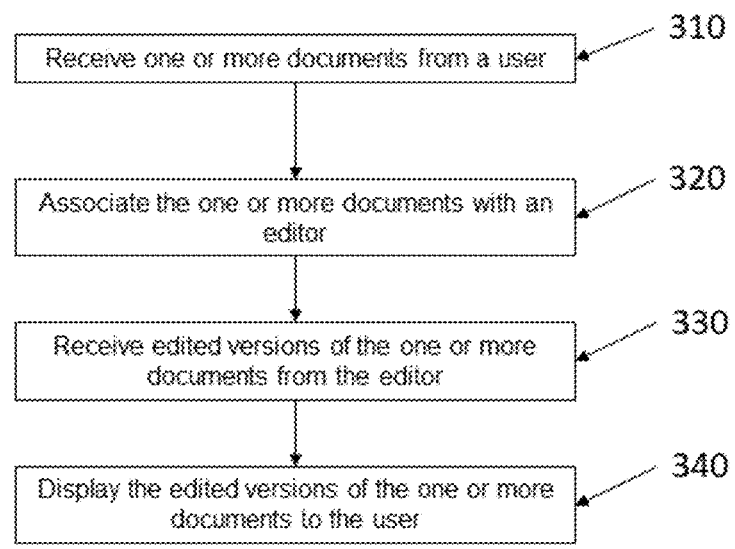
FIG. 3 is a flow chart for an example process for editing an essay.

The essay subsystem 105 and the essay editing subsystem 110 are discussed in greater detail in FIG. 2 and FIG. 3, respectively. The essay prompts 104 that the essay sorting subsystem 105 sorts may comprise essay prompts for applying to the personalized school list 102. The application subsystem 103 may generate a plurality of essay prompts taken from the schools in the list. For example, if UC Berkeley is a school on the personalized list of schools, the personalized list subsystem may go to the essay prompts that UC Berkeley asks for in an application and add the prompts to the list of prompts the essay sorting subsystem will be applied to. The essay sorting subsystem 105 may use essay prompts input by the user 111. The essay sorting subsystem 105 may comprise a natural language processing (NLP) module 106 and a clustering module 107, as described herein. The NLP module 106 may implement a natural language processing algorithm that may process the essay prompts to generate features. The clustering module 107 may implement a clustering algorithm that processes the features to categorize the essay prompts into one or more subsets.

The subsystems of FIG. 1 and their components can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the subsystems. The computing devices can additionally have network communication devices. The network communication devices can enable the computing devices to communicate with each other and with any number of user devices, over a network. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

FIG. 2 is a flowchart of an example process for generating groups of similar essays. The process can be performed by the essay sorting subsystem 105 of FIG. 1, which may be implemented on one or more computers in one or more locations.

The essay sorting subsystem can obtain a plurality of essay prompts (210). The plurality of essay prompts may comprise textual essay prompts (e.g., a text document, a portion of a webpage), essay prompts from scanned documents (e.g., documents that were mailed to a user), or other prompt sources (e.g., verbal transcription). The scanned documents may be transformed into textual essay prompts by an optical character recognition (OCR) process. The essay sorting subsystem may obtain an essay prompt of the plurality of essay prompts by scrapping the prompt from a website (e.g., an algorithm that downloads data from the website of a college), retrieving the essay prompt from a database, retrieving the essay prompt from a single application service (e.g., the common application), or accepting the prompt from the user (e.g., a user submitted prompt). Each essay prompt of the plurality of essay prompts may be obtained by any method (e.g., all essay prompts of the plurality of essay prompts do not need to be obtained the same way).

The essay sorting subsystem may extract one or more features from each essay prompt using a natural language processing (NLP) algorithm (220). The one or more features may comprise at least 1, 2, 3, 4, 5, 6, 7, 8, 9, 10, 15, 20, 50, 100 or more features. The one or more features feature may comprise the subject of the essay prompt, the call of the essay prompt, the category of the essay prompt, the topic of the essay prompt, the allowed length of the essay, or any combination thereof. In some cases, the feature may be a semantic feature. The features may be quantitative features. The NLP algorithm may be a rule-based algorithm, a statistical algorithm, a machine learning algorithm, a semantic analysis algorithm, or any combination thereof. For example, the essay prompt can have a machine learning algorithm applied that determines not only what the question said literally, but also the intended call of the question.

Using the one or more features, the essay sorting subsystem can generate two or more subsets of the plurality of essays prompts (230). The two or more subsets may comprise at least 2, 3, 4, 5, 6, 7, 8, 9, 10, 15, 25, 50, or more subsets, up to the number of essay prompts 210. The essay sorting subsystem may minimize the quantity of the two or more subsets. The user may instruct the subsystem about a maximum number of subsets. An essay prompt in a subset may satisfy a measure of similarity to other essay prompts in the subset. The measure of similarity may comprise all essays having a value of at least one feature that is above a threshold value, having a value of at least one feature that is substantially similar, or a combination thereof. The measure of similarity may be a quantitative measure.

The essay sorting subsystem may generate the subsets by applying a clustering algorithm to the one or more features. The clustering algorithm can comprise a hierarchical clustering algorithm. A hierarchical clustering algorithm may be a clustering algorithm that clusters objects based on their proximity to other objects. For example, a hierarchical clustering algorithm can cluster essay prompts based on the proximity of NLP features from one essay prompt to corresponding NLP features from other essay prompts. The clustering algorithm can alternatively be a centroid-based clustering algorithm, e.g., a k-means clustering algorithm. A k-means clustering algorithm can partition n observations into k clusters, where each observation belongs to the cluster with the nearest mean. The mean can serve as a prototype for the cluster. In the context of NLP features from the subsystem 200, a k-means clustering algorithm can generate distinct groups of essay prompts that have NLP features that are correlated. The clustering algorithm can alternatively comprise a distribution-based clustering algorithm, e.g., a Gaussian mixture model or expectation maximization algorithm. Examples of other clustering algorithms that the subsystem 200 can train and implement are cosine similarity algorithms, topological data analysis algorithms, and hierarchical density-based clustering of applications with noise (HDB-SCAN).

The essay sorting subsystem may make recommendations as to the essays to be written for the two or more subsets. The recommendations may comprise a topic of the essay or a theme to be included in the essay. The essay sorting subsystem may generate a report on the applicability of at least one of a user's written essays to at least one of the essay prompts. For example, a student wrote 5 different application essays for 5 different prompts and then wants to have an essay for a sixth prompt. In this example, the essay sorting subsystem analyzes the new prompt and recommends one of the already written essays to answer the new prompt.

FIG. 3 is a flowchart of an example process for editing an essay. The process can be performed by the essay editing subsystem 110 of FIG. 1, which may be implemented on one or more computers in one or more locations.

The essay editing system can receive one more documents from a user (310). The one or more documents may be college admissions essays, personal statements, resumes, writing samples for an application, or financial aid application essays. The documents may be one or more types of documents. For example, a user can submit both a personal statement and an admissions essay to the marketplace.

The essay editing subsystem can associate the one or more documents with an editor (320). In some cases, the essay editing subsystem may associate the one or more documents with an editor automatically. For example, the essay editing subsystem may select one of a plurality of designated resume editors to edit a resume. The selected resume editor may meet one or more criteria, e.g., an availability criterion, a rating criterion, a price criterion, a language proficiency criterion, a subject expertise criterion, if the editor has worked with the user before, or the like. In other cases, the essay editing subsystem may associate the one or more documents with an editor in response to an editor selecting or claiming the essay on the college admissions platform.

The editor claiming the documents may be one of a plurality of editors for a plurality of documents. For example, one editor may claim a user's admissions essay while another editor may claim a user's financial aid essay. Alternatively, one editor may claim a plurality of documents. The editor may be an expert in the subject matter of the essay. The editor may have a limited time to complete the editing of the one or more documents. The editor may claim the one or more documents through a user interface, such as, for example, a graphical user interface (GUI).

The association of the editor with a document may prevent other editors from claiming the document. The association may be for a limited time. The association may be revoked by the user, the editor, or an administrator of the marketplace. The association may last for one or more editing cycles. For example, a user may like the work a particular editor is doing, so the user can choose to have the same editor perform an additional round of edits after the first.

The essay editing subsystem can receive edited versions of the one or more documents from the editor (330). The edited version may comprise the original one or more documents with one or more added deletions, insertions, comments, other feedback, or any combination thereof. The edited versions may be generated according to instruction from the user.

The essay editing subsystem can then display the edited versions of the document to the user (340). The documents may be displayed to the user in a GUI. The user may download the documents. The user may be able to comment on the quality of the edited documents. The user may be able to interact with the editor to clarify the edits to the documents. The user may be able to leave a review of the editor, which may comprise a sore and/or a written review.

The edited document may be further analyzed by an algorithm. The algorithm may comprise an algorithm as described herein, such as, for example, a natural language processing algorithm. The edited versions of the one or more documents may comprise emotional tone scores that may indicate a likelihood that a reader of said one or more documents may experience one or more emotions. The emotional tone score may be generated by the algorithm. For example, the algorithm is applied to an edited document, and it produces a score of the likelihood that the document will make a reader feel joy. The algorithm may generate an emotional tone score on both the edited and unedited versions of the one or more documents. The user may use the emotional tone score as at least a part of a determination if a desired emotion is conveyed by the one or more documents.

Figure 4:
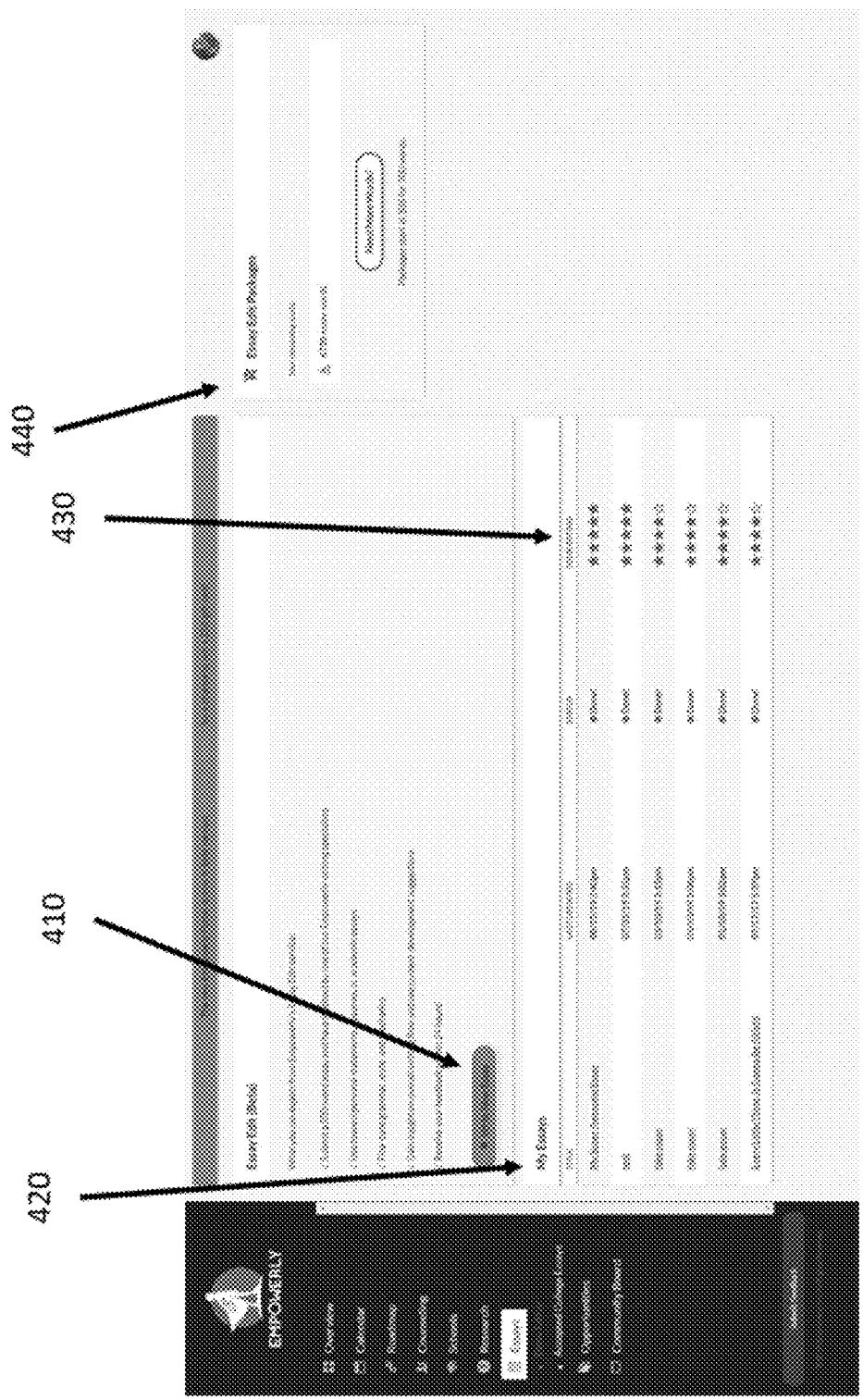
FIG. 4 is an example user interface for an essay editing marketplace.

FIG. 4 shows an example user interface 400 for the essay editing marketplace. The user interface may enable a user to initiate the creation of a new document to be placed on the essay editing marketplace, for example with a button 410. The user interacting with the button may open a different user interface. The user may be able to keep track of the essays that have been started or submitted using a list 420. The list may have at least one piece of information, such as the user generated name of the essay, the type of the essay, the date of submission, the status of the essay edits, the due date of the essay, and the school the essay is for. The list may be ordered with respect to any one of the pieces of information. For example, the list may be ordered by the due date of the essay where the nearest due date appears first. The list may further comprise a rating 430 given by the user to the quality of the edits made by the editor. The rating may comprise a numerical rating, a graphical-based rating (e.g., stars), a written rating (e.g., a review), or any combination thereof. The user may be apprised of the details of how much editing the user has paid for in another part of the interface 440. The user may subscribe to the essay editing marketplace (e.g., pay by the month), pay by the word for each essay submitted, pay by the number of essays submitted, or any combination thereof.

The essay editing subsystem may comprise a computer implemented marketplace. The marketplace may comprise an online marketplace. The marketplace may have a standard cost to a user for an editor to edit the user's one or more documents. For example, a personal statement can cost the user $300 to be edited. The marketplace may have a scaling cost to the user for the edits. For example, a personal statement can cost $50 per page to be edited. The marketplace may have different costs to the user depending on the editor who claims the user's one or more documents. For example, three different editors can have rates of $100, $150, and $200 per document edited, respectively. The user may set a maximum budget, a minimum budget, or both for the total cost of the editor editing the user's one or more documents. For example, a user may say that they are willing to pay no more than $100 for their financial aid application to be edited. In this example, a number of editors may choose not to claim this document, as the payment may be too low.

Figure 5:
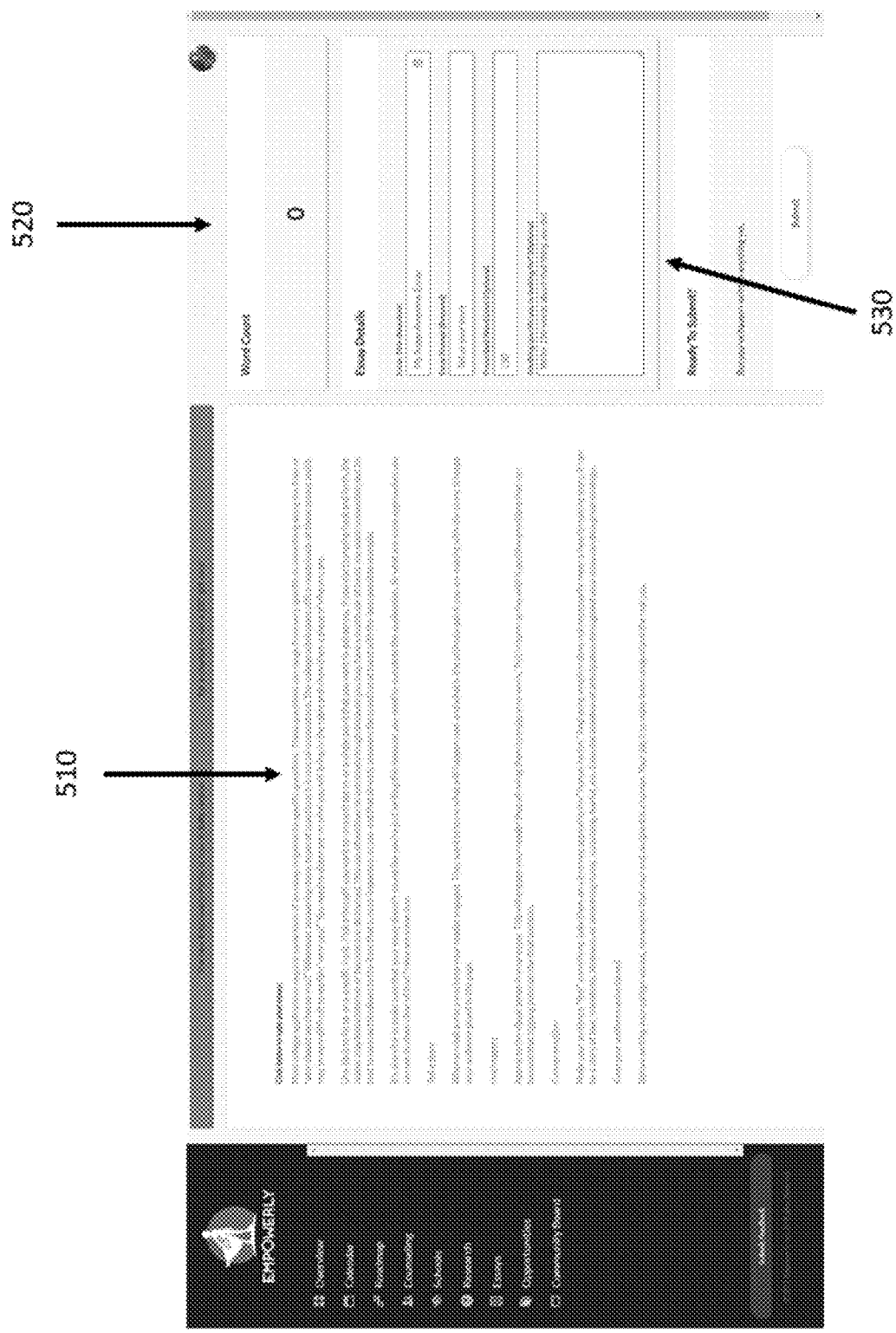
FIG. 5 is an example user interface for submitting an essay to an essay editing marketplace.

FIG. 5 shows an example user interface 500 for submitting an essay to the essay editing marketplace. A user may access the interface 500 by interacting with a different element of another user interface (e.g., pressing a button). The interface may comprise information 510. The information 510 may comprise instruction on using the essay submission interface, on writing an essay, on best practices for writing an essay of quality, or the like. The interface may display information about the user's essay 520. The information 520 may comprise word count, page length, estimated cost of editing, compliance with the formal requirements of one or more schools, or any combination thereof. The interface may comprise an area to prepare an essay for submission 530. The area 530 may comprise a space for a title, the relevant essay prompt, the desired word count, additional comments, requests, or any combination thereof. The essay may be uploaded (e.g., a document on the user's device may be transmitted to the marketplace) or written within an element of the area. The area may comprise an element to submit the essay, such as, for example, a button.

Figure 6:
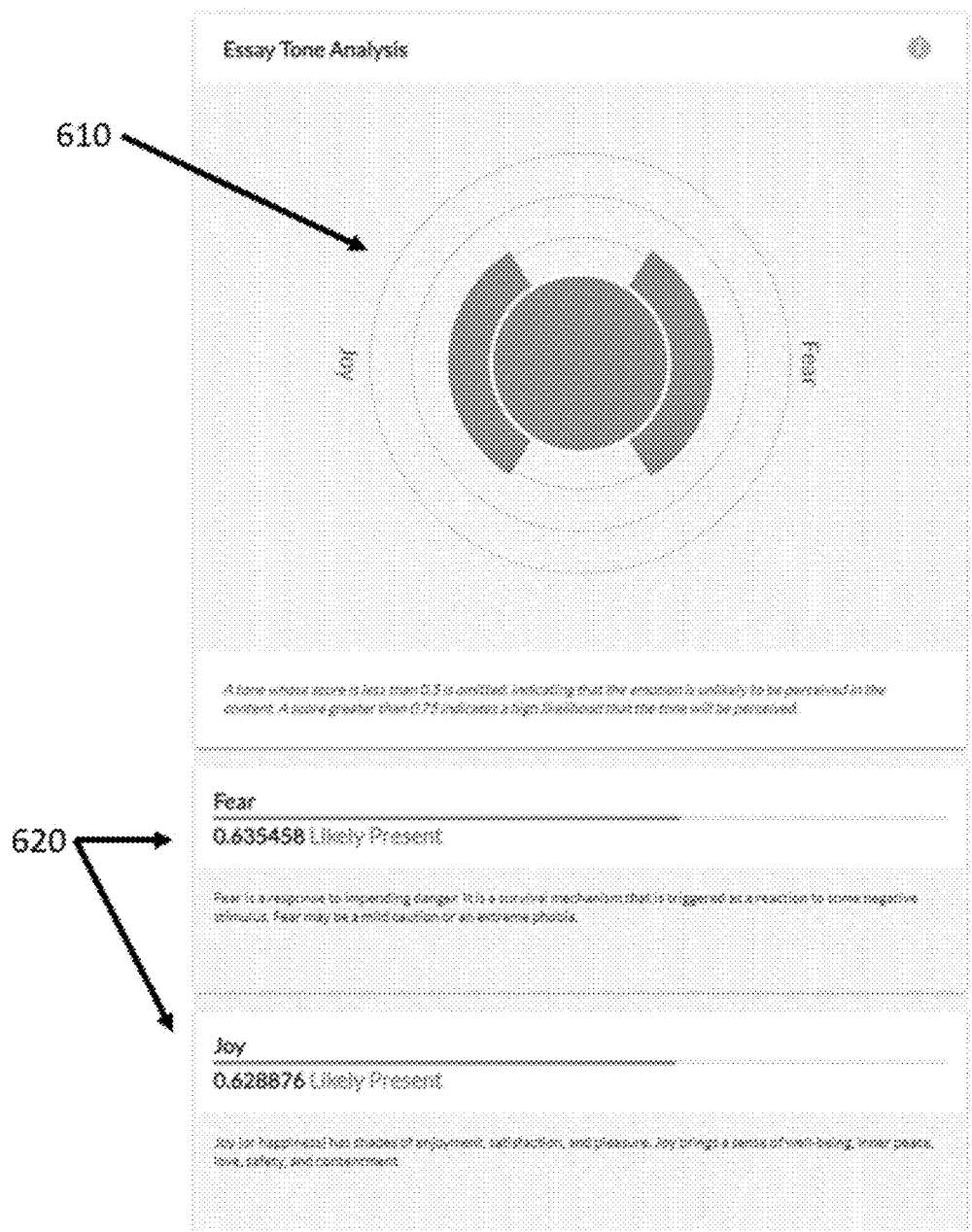
FIG. 6 is an example emotional tone score display.

FIG. 6 shows an example emotional tone score display 600. The emotional tone score may comprise a representation of the emotional tone score 610. The representation 610 may comprise a graphical representation, a textual representation, a numerical representation, or any combination thereof. The representation may comprise at least one tone. For example, the representation may show the likelihood a reader of an essay would experience fear or joy. The representation may display any number of tones up to the total number of tones detected in the essay. The representation may have a threshold value that is exceeded to display a tone. The display 600 may further comprise an explanation of the emotional tone score 620. The explanation 620 may comprise a numerical score that may indicate the likelihood a given tone may be perceived by a reader. The explanation 620 may further comprise an additional explanation of what the tones scored in 610 mean. For example, the explanation can explain to the user what fear and joy mean.

Figure 7:
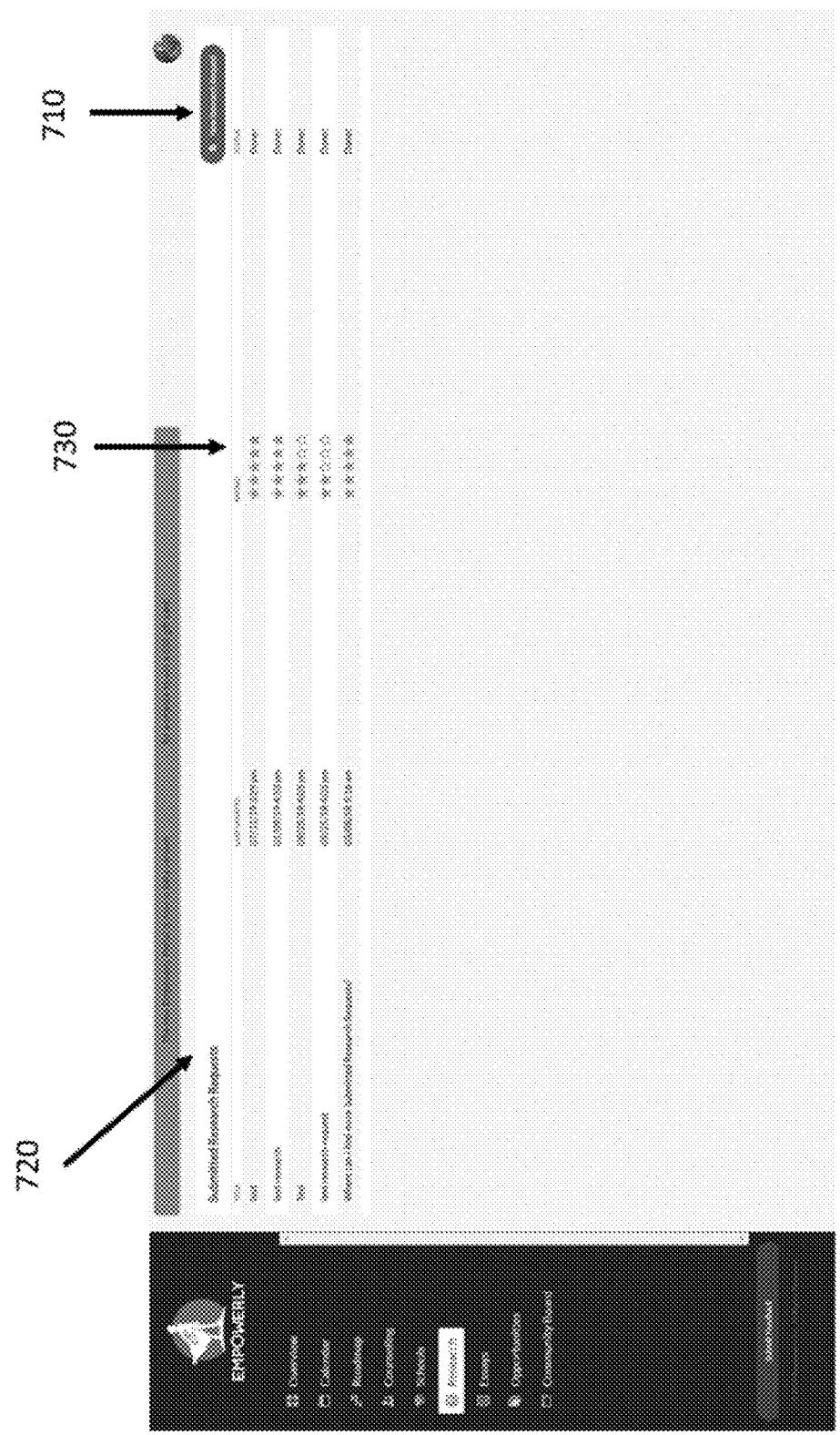
FIG. 7 is an example of an interface for a research request marketplace.

FIG. 7 shows an example of an interface for a research request marketplace 700. The interface 700 may be accessed by a user. The interface 700 may allow a user to initiate the generation of a new research request via an element of the interface, such as, for example a button 710. The user interacting with the method to initiate creation of a new research request may open a different user interface. The user may be able to keep track of the research requests that have been started or submitted using a list 720. The list may comprise at least one piece of information, such as the user generated name of the research request, the type of research request, the date of submission, the status of the research request, the due date of the research request, and the topic the research request is for. The list may be ordered with respect to any one of the pieces of information. The list may further comprise a rating 730 given by the user to the quality of the answer given to the user. The rating may comprise a numerical rating, a graphical based rating (e.g., stars), a written rating (e.g., a review), or any combination thereof.

Figure 8:
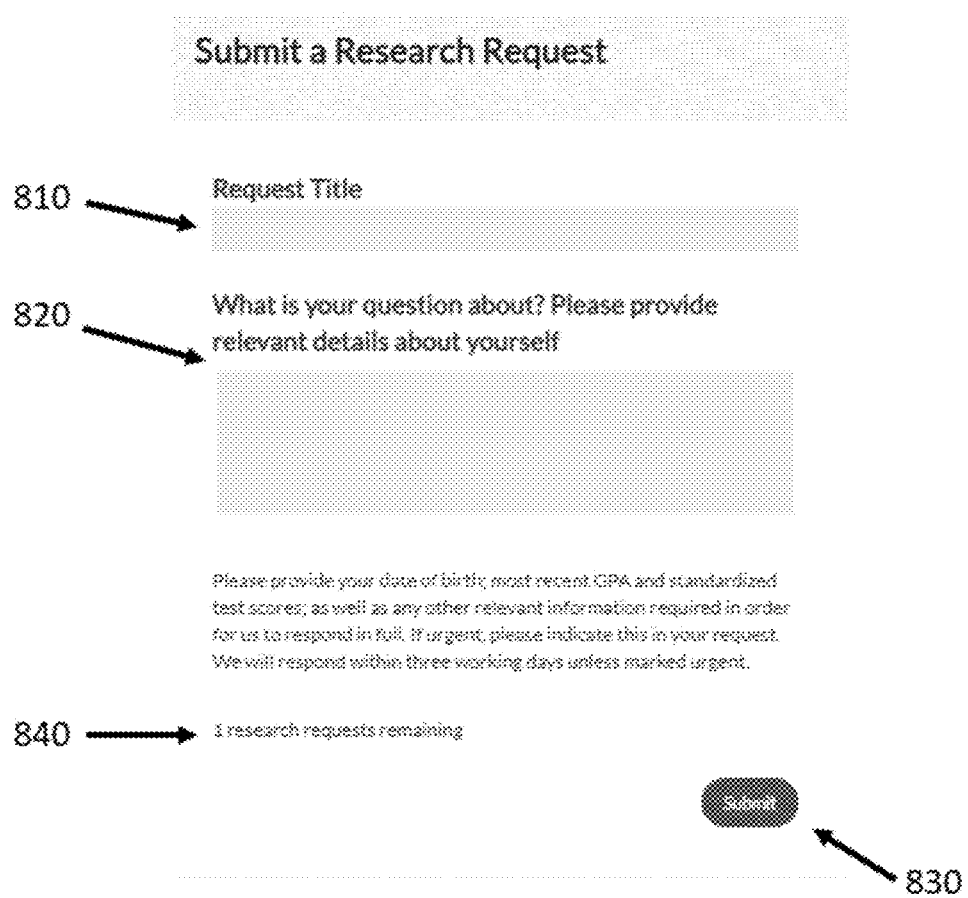
FIG. 8 is an example user interface for submitting a research request.

FIG. 8 shows an example user interface for submitting a research request 800. The user may give a title to the research request 810. The title 810 may be mandatory. The user may provide information on the research request 820. The information may comprise the research request, information about the user, a due date of the research request, information about the topic of the research request, or any combination thereof. The user may submit a research request using an element of the interface 800, such as, for example, a button 830. The user may see the number of research requests the user has paid for in another element 840. The user may pay a subscription, pay by the research request submitted, or a combination thereof. The user may pay more for an urgent research request.

Figure 9:
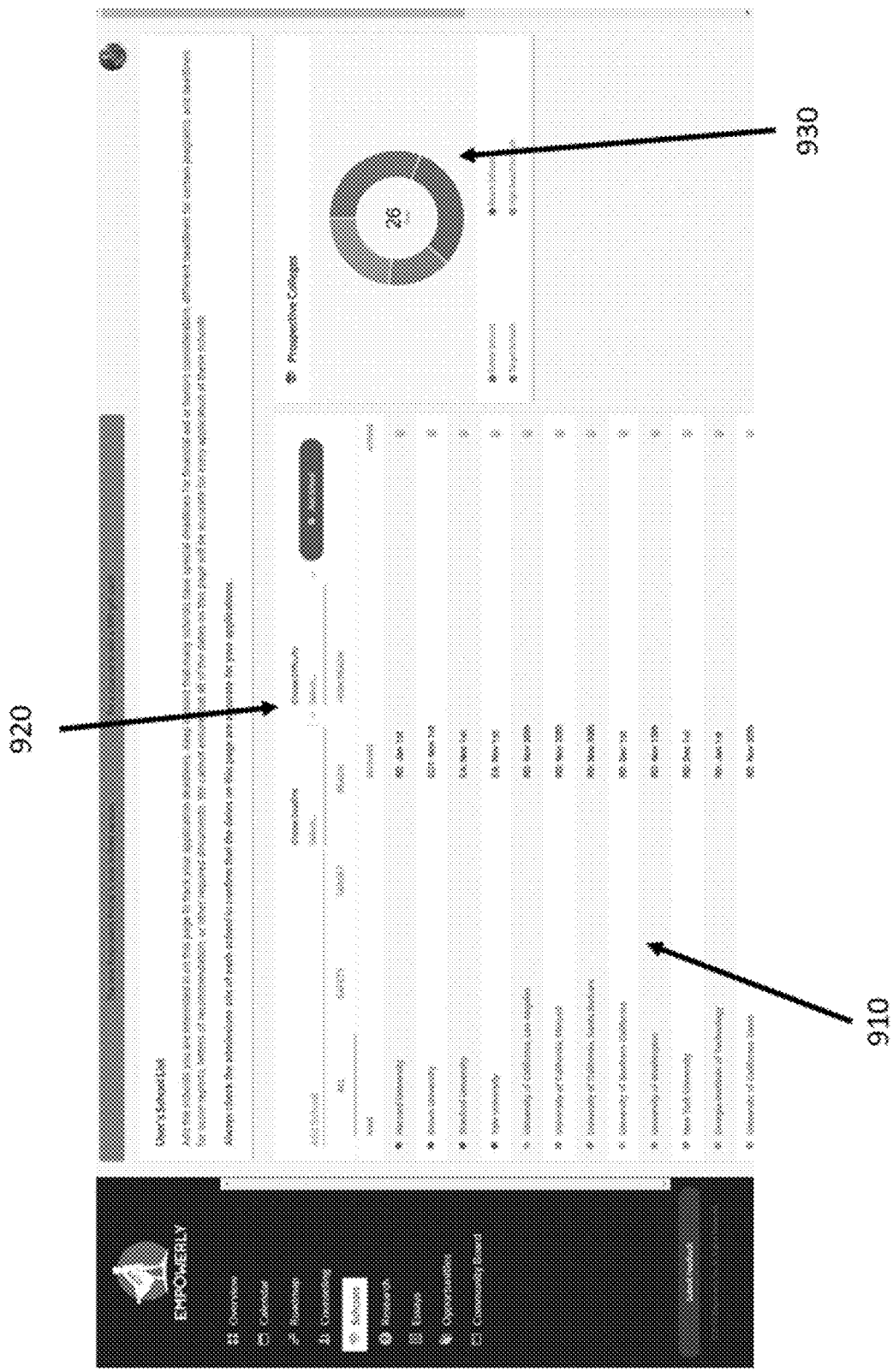
FIG. 9 is an example user interface for a personalized college list.
Figure 11:
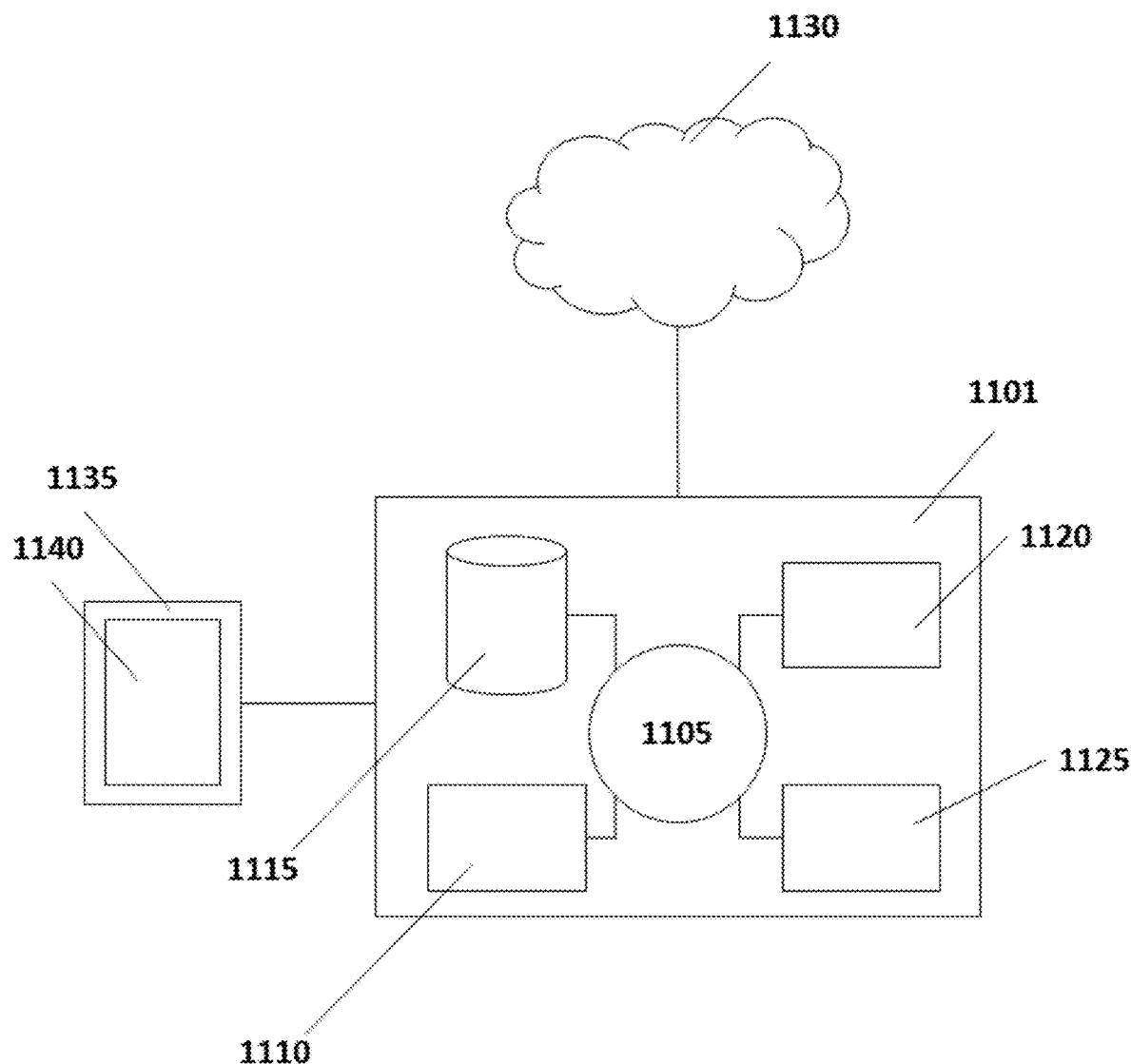
FIG. 11 shows a computer system that is programmed or otherwise configured to implement methods provided herein.

FIG. 9 shows an example user interface for a personalized college list 900. The interface 900 may comprise a collection of colleges 910. The collection 910 may further comprise information about the colleges of the collection of colleges. The information may comprise application due dates, applicant assigned qualifiers (e.g., if a college is a "safety school"), applicant provided notes, or any combination thereof. The collection 910 may be sorted and/or filtered by any one of the information categories. Additional colleges may be added to the collection 910 via an additional element of the interface, such as, for example, an entry line 920. The entry line 920 may comprise a plurality of categories for searching new colleges, including college name, location, attributes (e.g., selective, private), or any combination thereof. The entry line 920 may comprise a selectable deadline (e.g., regular decision, early decision) and/or an applicant assignable qualifier (e.g., if a college is a "reach school"). The entry line 920 may further comprise an element to add the new college to the collection, such as, for example, a button. The interface 900 may further comprise a representation of the collection 930. The representation 930 may be graphical. The representation may be dynamic. The representation may be of the applicant assignable qualifiers of the collection 910 (e.g., how many schools are "reach schools" versus "safety schools" versus "target schools"). The representation 930 may comprise other information, such as the distribution of deadlines, of school costs, of school location, of undergraduate populations, or the like. The representation 930 may be interactive. For example, a user can click on the portion labeled "high reach schools" and the collection 910 would be filtered to show only "high reach schools."

Figure 10:
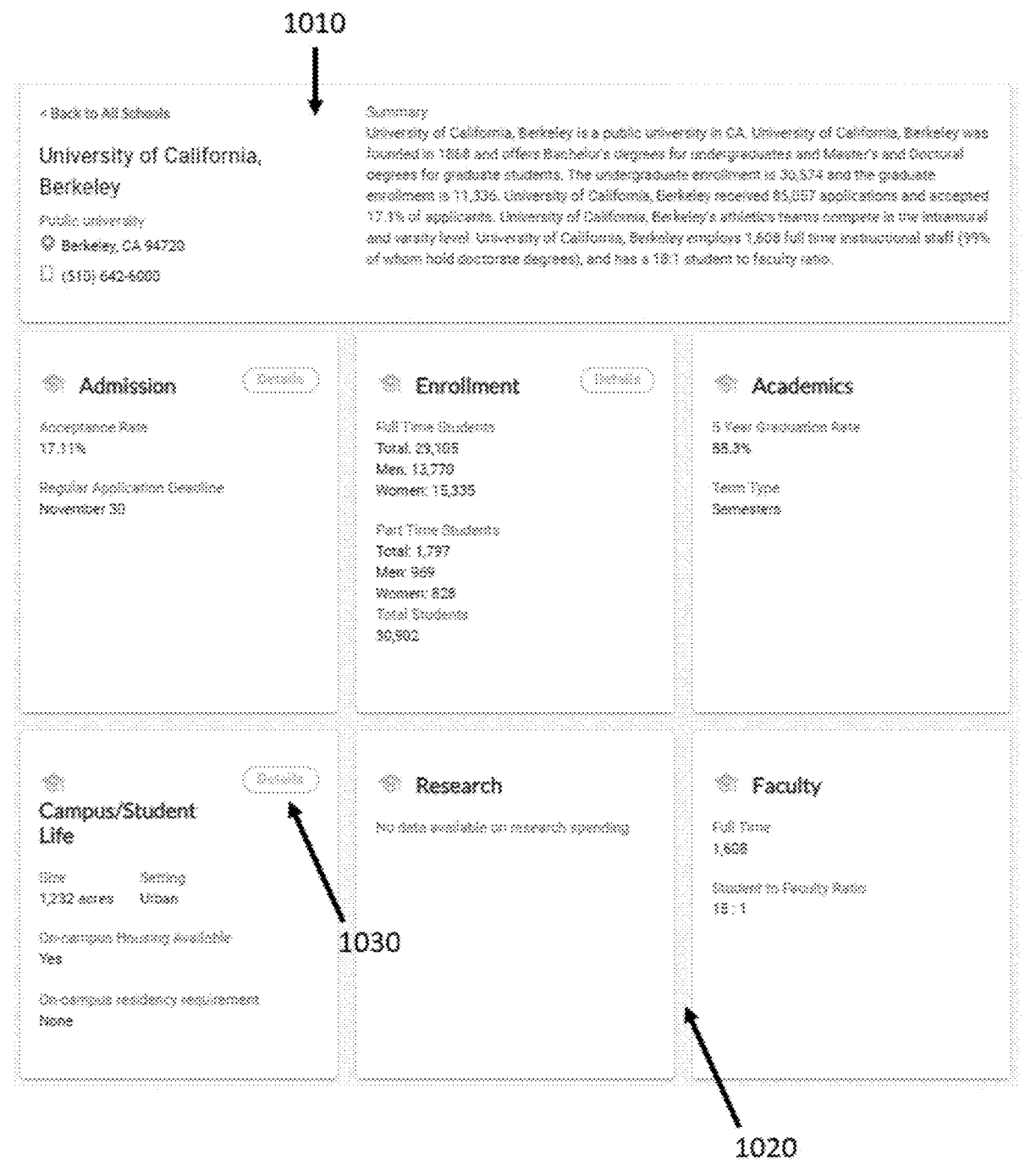

FIG. 10 shows an example detail view of a college 1000. The view 1000 may be accessed by interacting with an element of FIG. 9 collection 910. The view 1000 may comprise a summary 1010. The summary may comprise information about the school (e.g., contact information, location, university type) and/or a brief summary of school statistics. The view 1000 may further comprise detailed information 1020. The detailed information may comprise admission statistics, enrollment statistics, academic statistics, campus statistics, research statistics, faculty statistics, any combination thereof, and the like. The detailed information may further comprise additional information accessible via an element of the interface, such as, for example, a button 1030. The additional information may provide further detail (e.g., admitted applicant GPA, school sports teams).

Computer Systems

The present disclosure provides computer systems that are programmed to implement methods of the disclosure. FIG.

11 shows a computer system 1101 that is programmed or otherwise configured to implement the system 100 for FIG. 1. The computer system 1101 can regulate various aspects of the present disclosure, such as, for example, the process 200 of FIG. 2 and/or the process 300 of FIG. 3. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems include personal computers (e.g., portable PC, a 'laptop' PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine-readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or it can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, the example interface of any one of FIGS. 4-10. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105. The algorithm can, for example, be one of the neural networks described in this disclosure.

Machine Learning

Machine learning algorithms implemented on a client device or a remote server can process textual information. For example, a machine learning algorithm can be configured to determine the tone of an essay. A different machine learning algorithm can be trained to classify essay prompts based on their similarity to other essay prompts.

The machine learning algorithms can be supervised, semi-supervised, or unsupervised. A supervised machine learning algorithm can be trained using labeled training inputs, i.e., training inputs with known outputs. The training inputs can be provided to an untrained or partially trained version of the machine learning algorithm to generate a predicted output. The predicted output can be compared to the known output, and if there is a difference, the parameters of the machine learning algorithm can be updated. A semi-supervised machine learning algorithm can be trained using a large number of unlabeled training inputs and a small number of labeled training inputs. An unsupervised machine learning algorithm, e.g., a clustering algorithm, can find previously unknown patterns in data sets without pre-existing labels.

One example of a machine learning algorithm that can perform some of the functions described above, e.g., performing natural language processing, is a neural network. Neural networks can employ multiple layers of operations to predict one or more outputs, e.g., emotional tone scores, from one or more inputs, e.g., user submitted essays. Neural networks can include one or more hidden layers situated between an input layer and an output layer. The output of each layer can be used as input to another layer, e.g., the next hidden layer or the output layer. Each layer of a neural network can specify one or more transformation operations to be performed on input to the layer. Such transformation operations may be referred to as neurons. The output of a particular neuron can be a weighted sum of the inputs to the neuron, adjusted with a bias and multiplied by an activation function, e.g., a rectified linear unit (ReLU) or a sigmoid function.

Training a neural network can involve providing inputs to the untrained neural network to generate predicted outputs, comparing the predicted outputs to expected outputs, and updating the algorithm's weights and biases to account for the difference between the predicted outputs and the expected outputs. Specifically, a cost function can be used to calculate a difference between the predicted outputs and the expected outputs. By computing the derivative of the cost function with respect to the weights and biases of the network, the weights and biases can be iteratively adjusted over multiple cycles to minimize the cost function. Training can be complete when the predicted outputs satisfy a convergence condition, such as obtaining a small magnitude of calculated cost.

Convolutional neural networks (CNNs) and recurrent neural networks can be used to classify or make predictions from text data. CNNs are neural networks in which neurons in some layers, called convolutional layers, receive words from only small portions of a text document. These small portions may be referred to as the neurons' receptive fields. Each neuron in such a convolutional layer can have the same weights. In this way, the convolutional layer can detect features, e.g., essay prompt features, in any portion of the input.

Other examples of machine learning algorithms that can be used to process text data are regression algorithms, decision trees, support vector machines, Bayesian networks, clustering algorithms, reinforcement learning algorithms, and the like.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A computer-implemented method for generating essay recommendations for a user, comprising:
   (a) receiving a set of user provided information and preferences;
   (b) processing the set of user provided information and preferences to generate a personalized school list for the user, the personalized school list comprising a plurality of schools;
   (c) retrieving a plurality of essay prompts for the plurality of schools in the personalized school list for the user;
   (d) processing, using a natural language processing algorithm, the plurality of essay prompts to generate a plurality of features for the plurality of essay prompts;
   (e) identifying, based on the plurality of features, a subset of essay prompts in the plurality of essay prompts such that a single essay can be responsive to each essay prompt in the subset; and (f) providing a report to the user, wherein the report comprises (1) an applicability of at least one of the user's written essays to the subset of essay prompts, or (2) an essay prompt in the subset of essay prompts.

2. The computer-implemented method of claim 1, wherein the set of user provided information and preferences comprises any one of: grade point average (GPA), standardized test scores (e.g., Scholastic Aptitude Test (SAT) scores, and American College Testing (ACT) scores.

3. The computer-implemented method of claim 1, wherein the set of user provided information and preferences comprises the user's prospective major.

4. The computer-implemented method of claim 1, wherein the plurality of features comprises an essay prompt, a call of the essay prompt, a category of the essay prompt, a topic of the essay prompt, an allowed length of the essay, or any combination thereof.

5. The computer-implemented method of claim 1, wherein the plurality of features comprises a semantic feature.

6. The computer-implemented method of claim 1, wherein the report is generated by processing the at least one of the user's written essays using a natural language processing algorithm to generate a second plurality of features.

7. The computer-implemented method of claim 1, wherein the receiving the set of user provided information and preferences is through a computer implemented marketplace.

8. The computer-implemented method of claim 1, wherein the providing the report to the user is through a computer implemented marketplace.

9. The computer-implemented method of claim 1, wherein the identifying identifies a plurality of subsets of essay prompts.

10. The computer-implemented method of claim 1, wherein the personalized school list comprises admission statistics, enrollment statistics, academic statistics, campus statistics, research statistics, faculty statistics, any combination thereof for the plurality of schools.

11. A system comprising one or more computer processors; and memory comprising machine-executable instructions that, upon execution by said one or more computer processors, implements an online editing marketplace, wherein said online editing marketplace is configured to:

(g) receive one or more documents from a user, said one or more documents comprising college application documents;

(h) associate said one or more documents with an editor in response to said editor claiming said one or more documents;

(i) receive edited versions of said one or more documents from said editor;

(j) generate, using a natural language processing algorithm, emotional tone scores of the edited versions of said one or more documents; and (k) display said emotional tone scores and said edited versions of said one or more documents to said user.

12. The system of claim 11, wherein said one or more documents comprise one or more essays of the user.

13. The system of claim 11, wherein said emotional tone score indicates a likelihood that a reader of said one or more documents may experience one or more emotions.

14. The system of claim 11, wherein said editor is a natural language processing algorithm.

15. The system of claim 11, wherein said emotional tone scores are displayed to said user with a graphical representation, a textual representation, a numerical representation, or any combination thereof.

16. The system of claim 15, wherein said emotional tone scores are displayed to said user with the graphical representation and the numerical representation.

17. The system of claim 11, wherein said emotional tone scores are displayed to said user with an individual representation for each emotional tone score.

18. The system of claim 11, wherein said natural language processing algorithm is a machine learning algorithm.

19. The system of claim 18, wherein said natural language processing algorithm is a neural network.

20. The system of claim 19, wherein said natural language processing algorithm is a convolutional neural network.

* * * * *